United States Patent
Sadique et al.

(10) Patent No.: US 12,010,614 B2
(45) Date of Patent: Jun. 11, 2024

(54) NON-TERRESTRIAL NETWORKS FOR INTERNATIONAL AREAS

(71) Applicant: Apple Inc., Cupertino, CA (US)

(72) Inventors: Mohammed Sadique, Auburn (AU); Alosious Pradeep Prabhakar, Singapore (SG); Chunlei Lin, Hong Kong (HK); Han Pu, Hong Kong (HK); Krisztian Kiss, Rancho Santa Fe, CA (US); Rohit R. Matolia, Bangalore (IN); Vijay Venkataraman, San Jose, CA (US); Sarma Vangala, Campbell, CA (US)

(73) Assignee: Apple Inc., Cupertino, CA (US)

( * ) Notice: Subject to any disclaimer, the term of this patent is extended or adjusted under 35 U.S.C. 154(b) by 351 days.

(21) Appl. No.: 17/576,578

(22) Filed: Jan. 14, 2022

(65) Prior Publication Data

US 2022/0232463 A1    Jul. 21, 2022

(30) Foreign Application Priority Data

Jan. 15, 2021   (IN) .............................. 202141001961

(51) Int. Cl.
*H04W 8/08*    (2009.01)
*H04W 48/16*   (2009.01)
(Continued)

(52) U.S. Cl.
CPC ............. *H04W 48/18* (2013.01); *H04W 8/08* (2013.01); *H04W 48/16* (2013.01); *H04W 84/042* (2013.01); *H04W 84/06* (2013.01)

(58) Field of Classification Search
CPC ....... H04W 48/18; H04W 8/08; H04W 48/16; H04W 84/042; H04W 60/04; H04W 84/06
(Continued)

(56) References Cited

U.S. PATENT DOCUMENTS

| | | | |
|---|---|---|---|
| 2022/0086671 A1* | 3/2022 | Hong | H04W 16/28 |
| 2022/0141764 A1* | 5/2022 | Catovic | H04W 48/16 370/329 |

(Continued)

FOREIGN PATENT DOCUMENTS

| | | |
|---|---|---|
| KR | 19990088124 A | 12/1999 |
| KR | 20200086623 A | 7/2020 |
| WO | 2019137517 A1 | 7/2019 |

OTHER PUBLICATIONS

First Examination Report for Indian Patent Application No. 202141001961; 5 pages; Aug. 4, 2022.

*Primary Examiner* — Hirdepal Singh
(74) *Attorney, Agent, or Firm* — Kowert, Hood, Munyon, Rankin & Goetzel, P.C.

(57) ABSTRACT

Systems, devices and methods for a user equipment (UE) to perform public land mobile network (PLMN) selection with a non-terrestrial network (NTN) dedicated to an international area. The UE receives a downlink message from the NTN, where the downlink message includes a public land mobile network (PLMN) identifier of a first PLMN of the NTN including an information element (IE). The IE indicates that the NTN is dedicated to an international area. Responsive to receiving the downlink message, the UE determines a current location of the UE and determines whether the current location is in the international area. The UE provides an international area notification to an access and mobility management function (AMF) servicing the UE to forward to a home PLMN (HPLMN) of the UE indicating whether the current location is in the international area.

20 Claims, 12 Drawing Sheets

(51) Int. Cl.
*H04W 48/18* (2009.01)
*H04W 84/04* (2009.01)
*H04W 84/06* (2009.01)

(58) Field of Classification Search
USPC .......................................................... 455/429
See application file for complete search history.

(56) References Cited

U.S. PATENT DOCUMENTS

2022/0150812 A1* 5/2022 Lin ....................... H04W 60/04
2023/0164685 A1* 5/2023 Wu ....................... H04W 48/04
　　　　　　　　　　　　　　　　　　　　　　　455/434
2023/0379811 A1* 11/2023 Niemi ................... H04W 48/18

* cited by examiner

NON-TERRESTRIAL NETWORKS FOR INTERNATIONAL AREAS

PRIORITY CLAIM

This application claims benefit of priority to Indian Application No. 202141001961, titled "Non-Terrestrial Networks for International Areas", filed Jan. 15, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless devices, and more particularly to methods, apparatuses, and systems for a wireless device communicating over a non-terrestrial cellular network and performing public land mobile network selection.

DESCRIPTION OF THE RELATED ART

Wireless communication systems are rapidly growing in usage. Wireless devices, particularly wireless user equipment devices (UEs), have become widespread. Additionally, people are becoming increasingly mobile including international travel. Non-terrestrial networks (NTNs) such as 3GPP satellite networks have increased in usage, in particular during international mobility scenarios. Accordingly, increased reliability and connectivity for UEs using NTNs are desirable.

SUMMARY

Embodiments are presented herein of methods, apparatuses, and systems for a wireless device to perform public land mobile network (PLMN) selection with a non-terrestrial network dedicated to an international area.

In some embodiments, a user equipment (UE) receives a downlink message from a non-terrestrial network (NTN), where the downlink message includes a public land mobile network (PLMN) identifier of a first PLMN of the NTN including an information element (IE). The IE indicates that the NTN is dedicated to an international area. The downlink message may be a broadcast message, a dedicated non-access stratum (NAS) message, or another type of downlink message, in various embodiments.

In some embodiments, responsive to receiving the downlink message, the UE determines a current location of the UE and determines whether the current location is in the international area.

In some embodiments, the UE provides an international area notification to an access and mobility management function (AMF) servicing the UE to forward to a home PLMN (HPLMN) of the UE indicating whether the current location is in the international area.

In some embodiments, a non-transitory memory medium may include program instructions executable by a UE that, when executed, cause the UE to perform at least a portion or all of the above operations. In some embodiments, a method performed by the UE may include the UE performing the above operations. In some embodiments, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
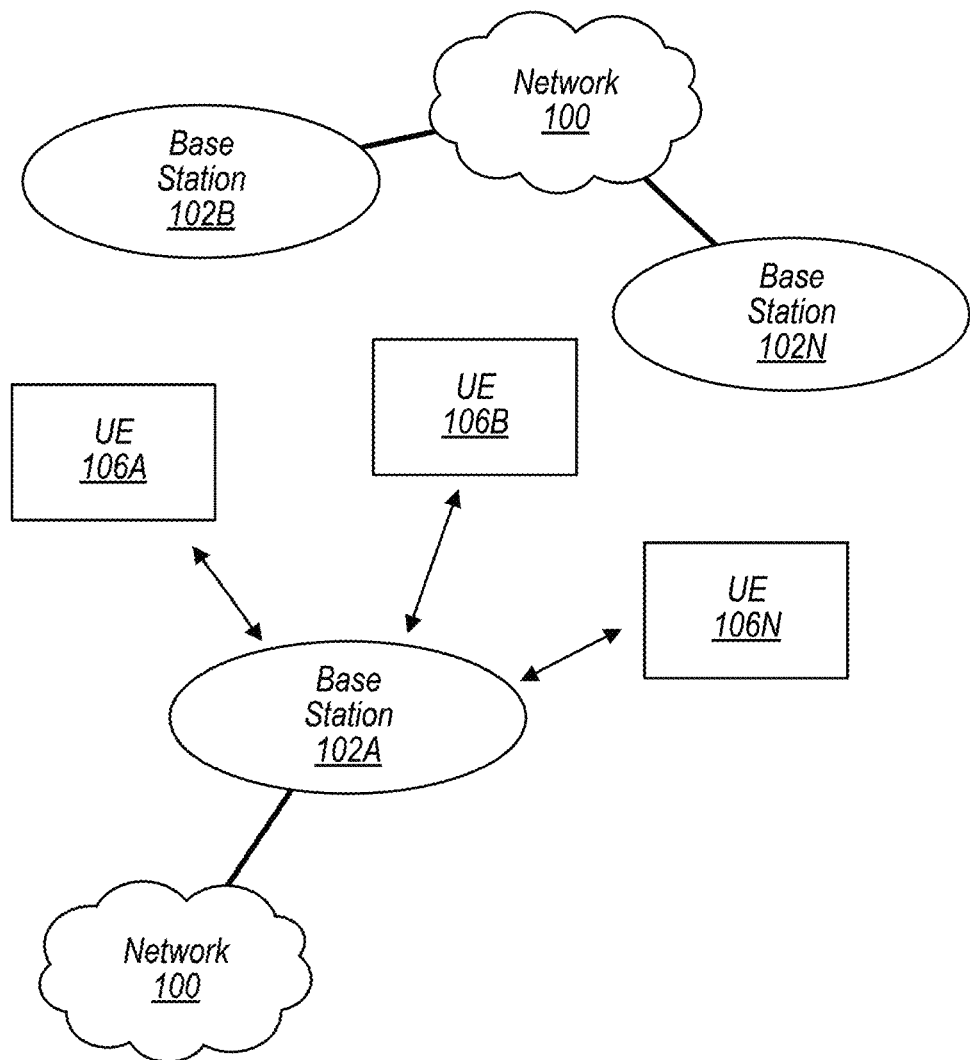
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:
5GCN: 5G Core Network
5GMM: 5G Mobility Management
AF: Application Function
NAS: Non-Access Stratum
NF: Network Function
AMF: Access and Mobility Management Function
CP: Control Plane
DN: Data Network
DNAI: Data Network Access Identifier
HO: Handover
PLMN: Public Land Mobile Network
HPPLMN: Higher Priority PLMN
UPLMN/OPLMN/VPLMN: User/Operator/Visited PLMN
LEO/MEO: Low/Medium Earth Orbit
GEO: Geosynchronous Equatorial Orbit
MCC: Mobile Country Code
NTN: Non-terrestrial Network
PCF: Policy Control Function
PDU: Protocol Data Unit
TA: Tracking Area
UDM: Unified Data Management
UDR: Unified Data Repository
UPF: User Plane Function
UE: User Equipment
BS: Base Station
eNB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
EPC: Evolved Packet Core
MME: Mobile Management Entity
RRC: Radio Resource Control
BWP: Bandwidth Part
TCI: Transmission Configuration Indicator
FDM: Frequency Division Multiplexing
SSB: Synchronization Signal Block
MAC: Medium Access Control
CE: Control Element
DCI: Downlink Control Information
QCL: Quasi-Colocated
PDCCH: Physical Downlink Control Channel
PDSCH: Physical Downlink Shared Channel
DL: Downlink
RSRP: Reference Signal Receive Power
L1: Layer-1
HARQ: Hybrid Automatic Repeat Request
NR: New Radio

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
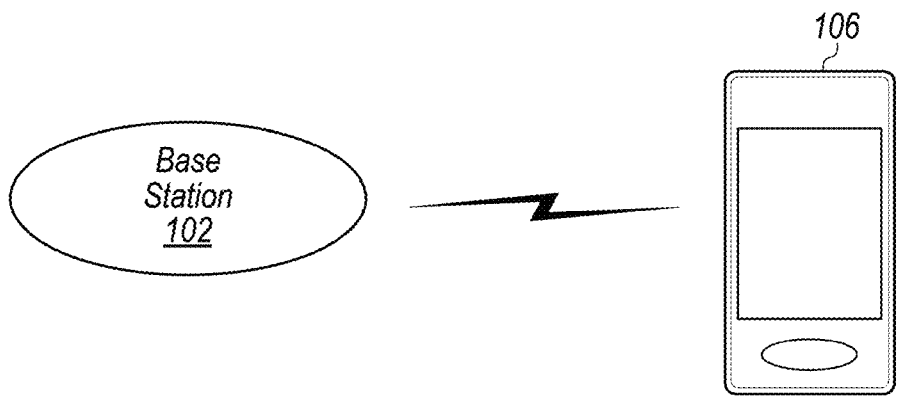
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), 5G NR satellite access (5G NR SAT), 6G, HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, 5G NR SAT, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
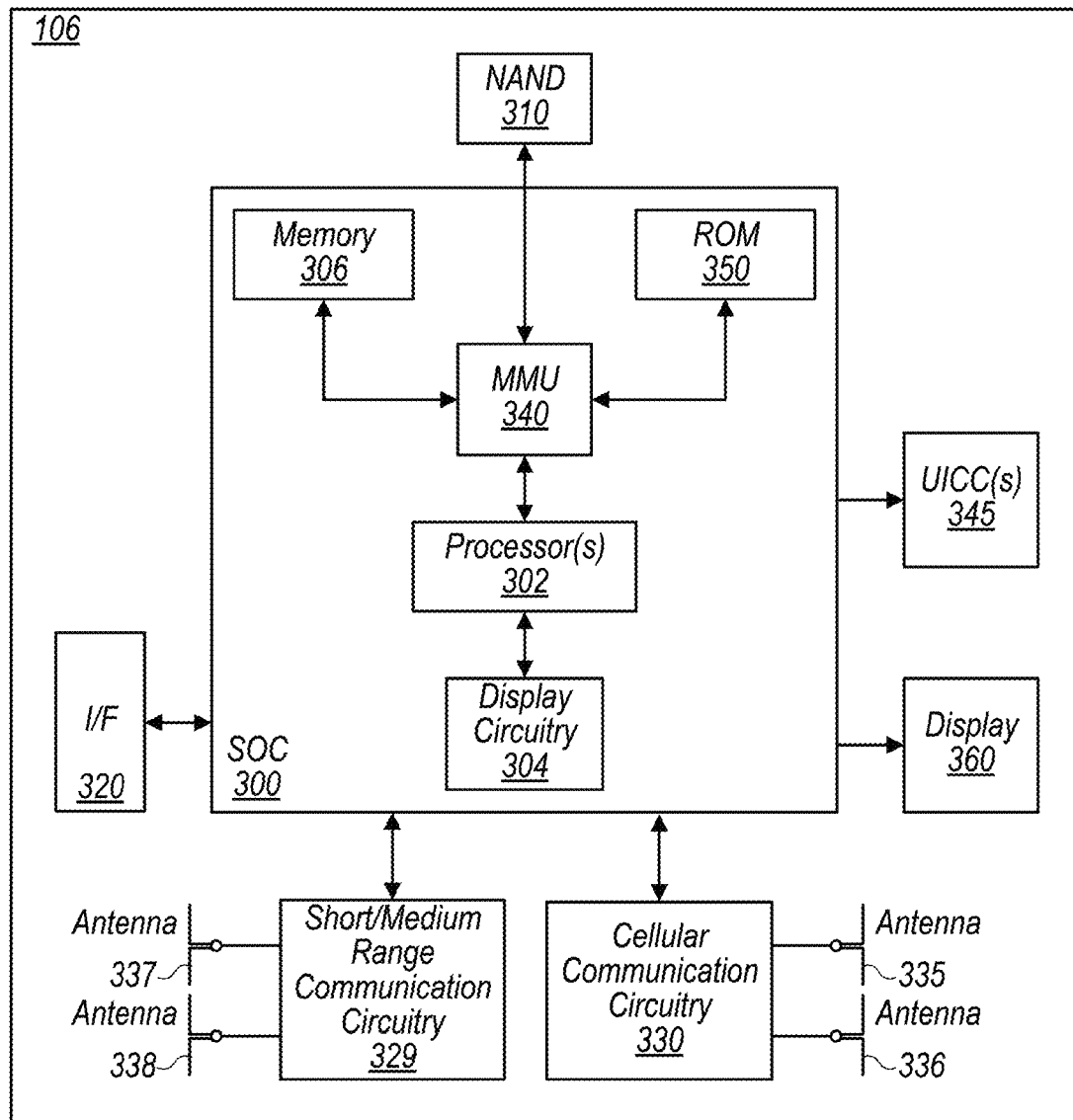
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short-range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short-range wireless communication circuitry 329 may include one or more ICs that are configured to perform the functions of short-range wireless communication circuitry 329. In addition, each integrated circuit may include circuitry (e.g., first circuitry, second circuitry, etc.) configured to perform the functions of short-range wireless communication circuitry 329.

Figure 4:
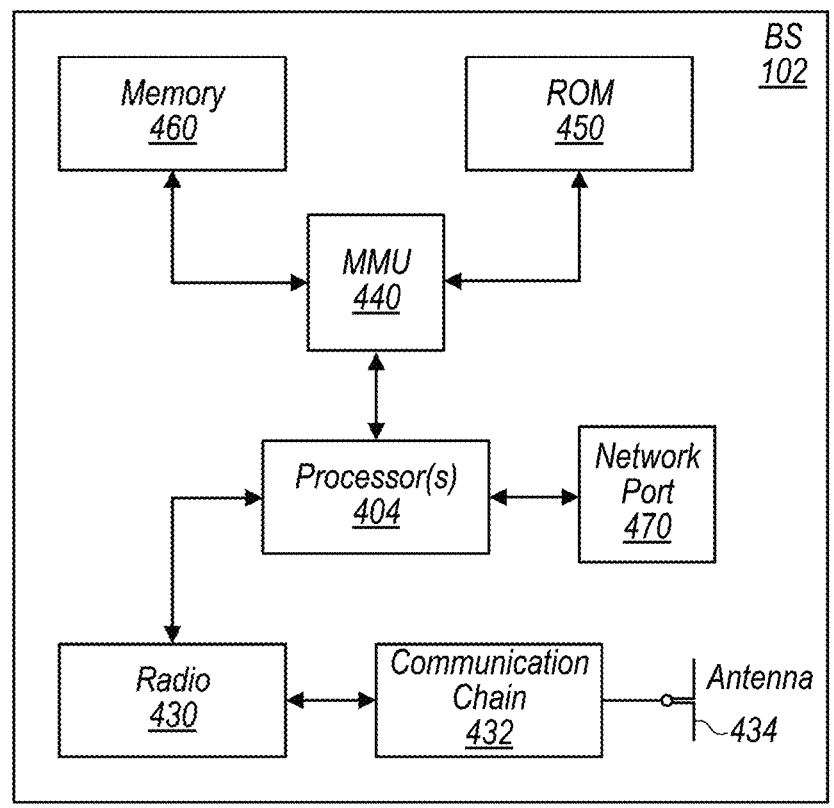
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, 5G NR SAT, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5GNR and Wi-Fi, 5GNR SAT and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
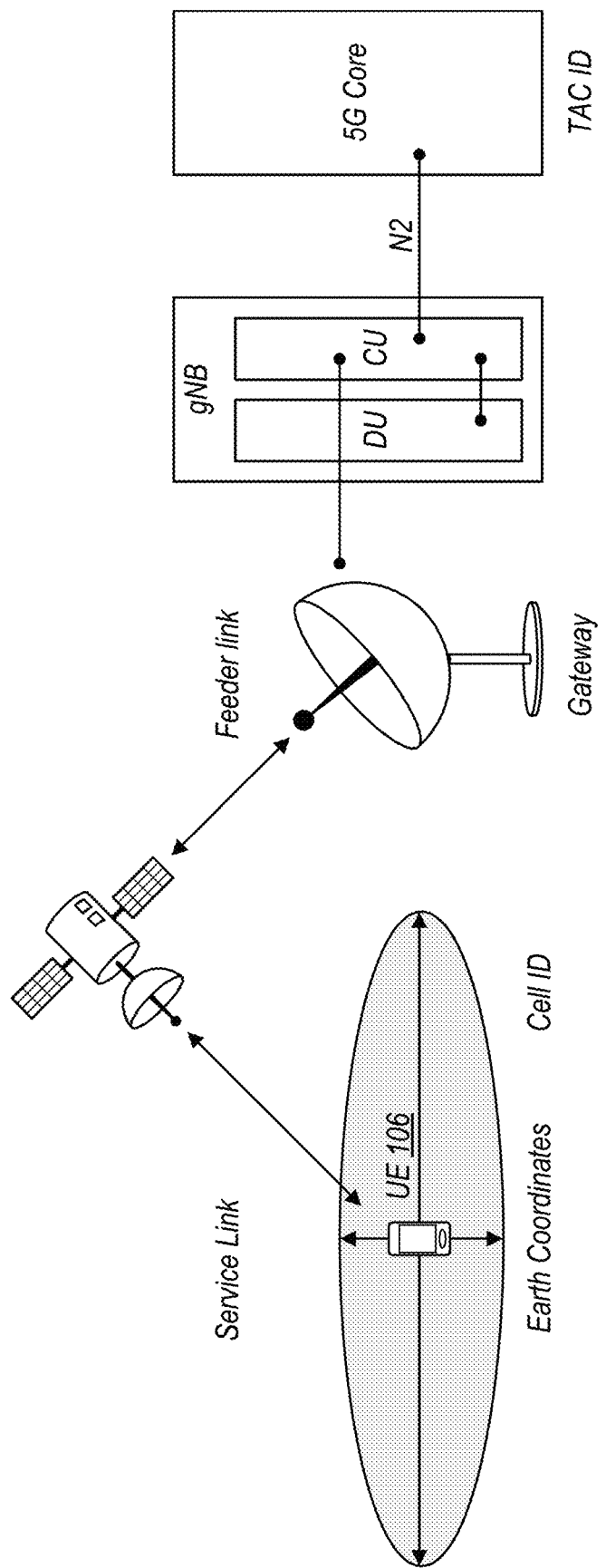
FIG. 5 is a network infrastructure diagram illustrating a 3GPP satellite network deployment, according to some embodiments.

FIGS. 5-6—3GPP Satellite Network Infrastructure

FIG. 5 is a network infrastructure diagram illustrating a 3GPP satellite network deployment, according to some embodiments. As illustrated, a satellite broadcasts a service link to a UE, such as UE 106, where the UE is operating within a cell. The satellite also conducts communications with a terrestrial gateway via a feeder link, and the gateway is in turn communicatively coupled to a base station (e.g., a gNB). The base station comprises a distributed unit (DU) and a centralized unit (CU). The base station is then coupled to a 5G Core Network (5GC) with a tracking area code (TAC) via an N2 interface.

Figure 6B:
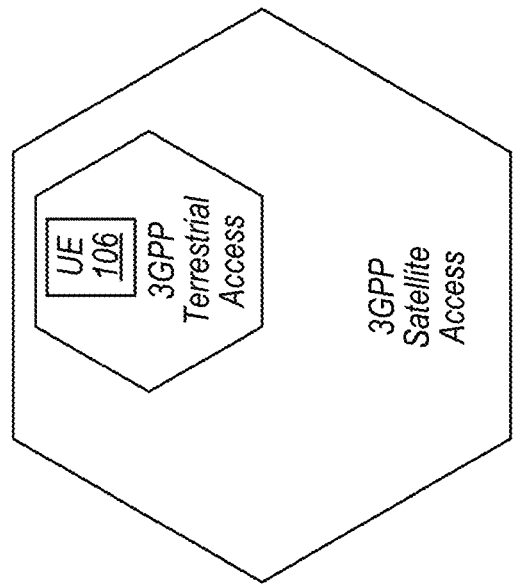
FIGS. 6A-B and schematic diagrams illustrating interworking between 3GPP terrestrial and satellite radio access networks (RANs), according to some embodiments.
Figure 6A:
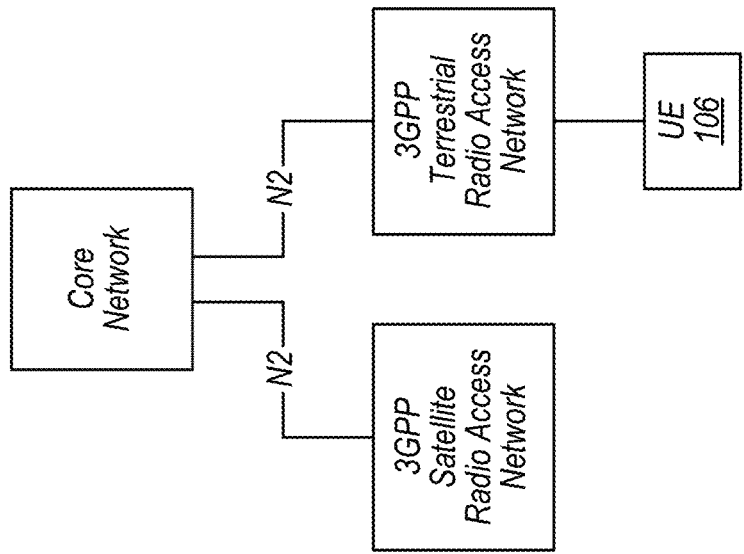
Figure 7A:
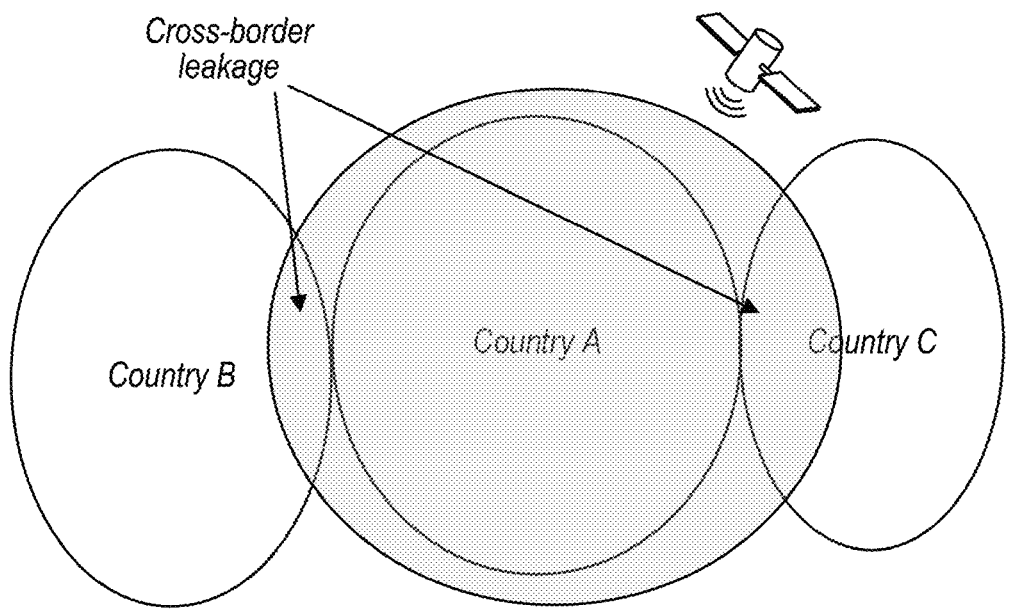
FIGS. 7A-D are different satellite deployment scenarios, according to various embodiments.
Figure 7B:
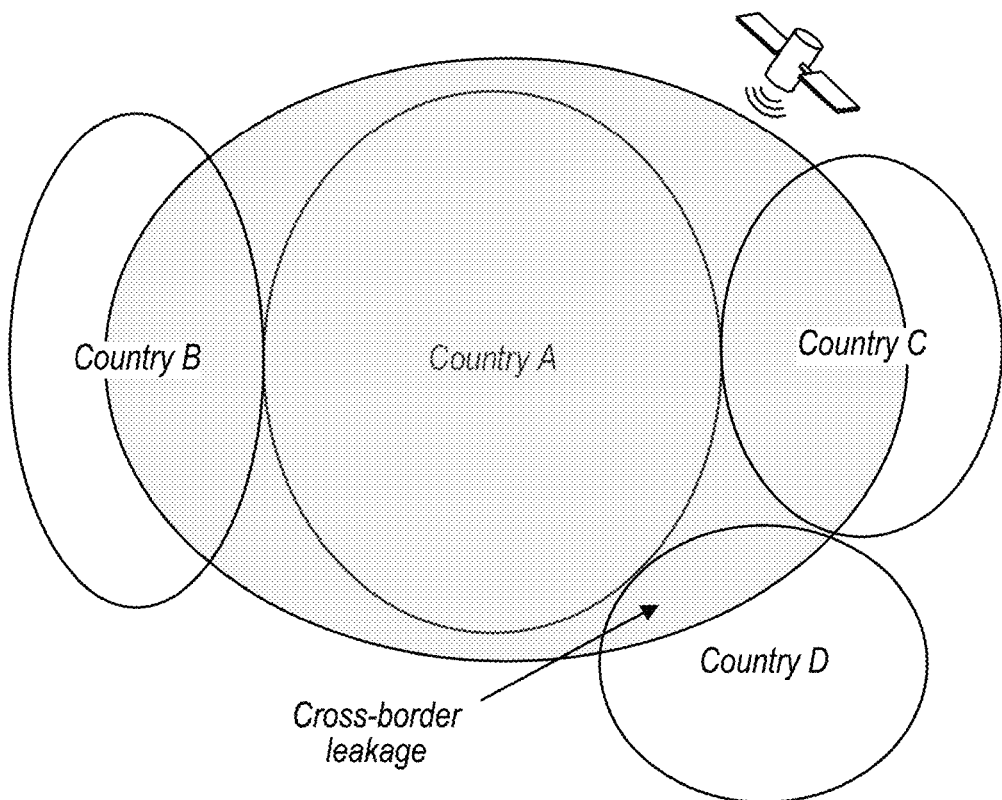
Figure 7C:
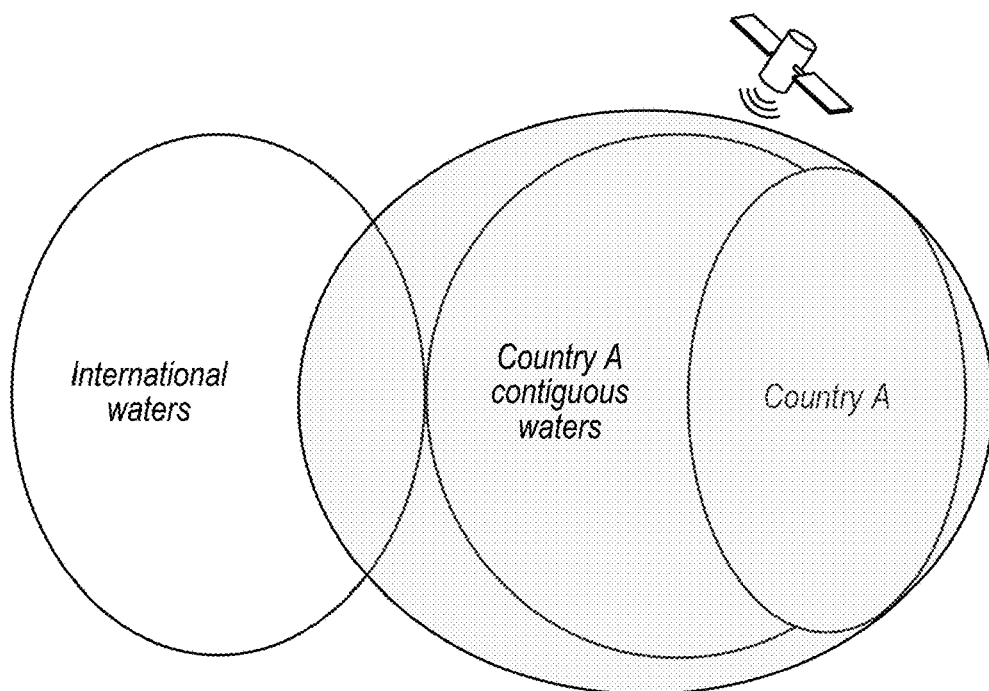
Figure 7D:
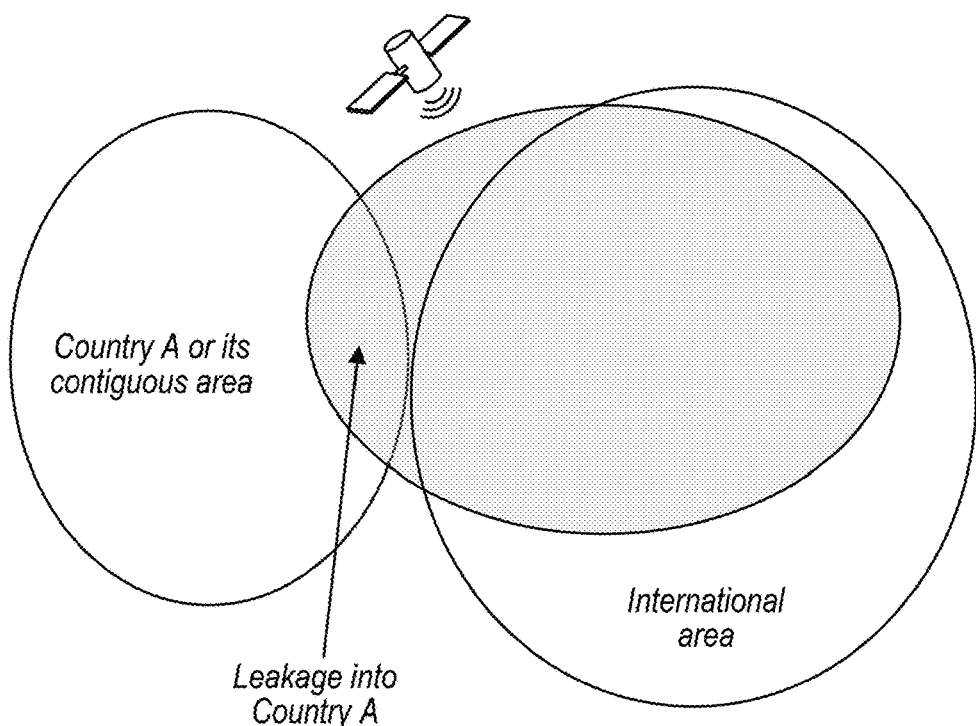
Figure 8:
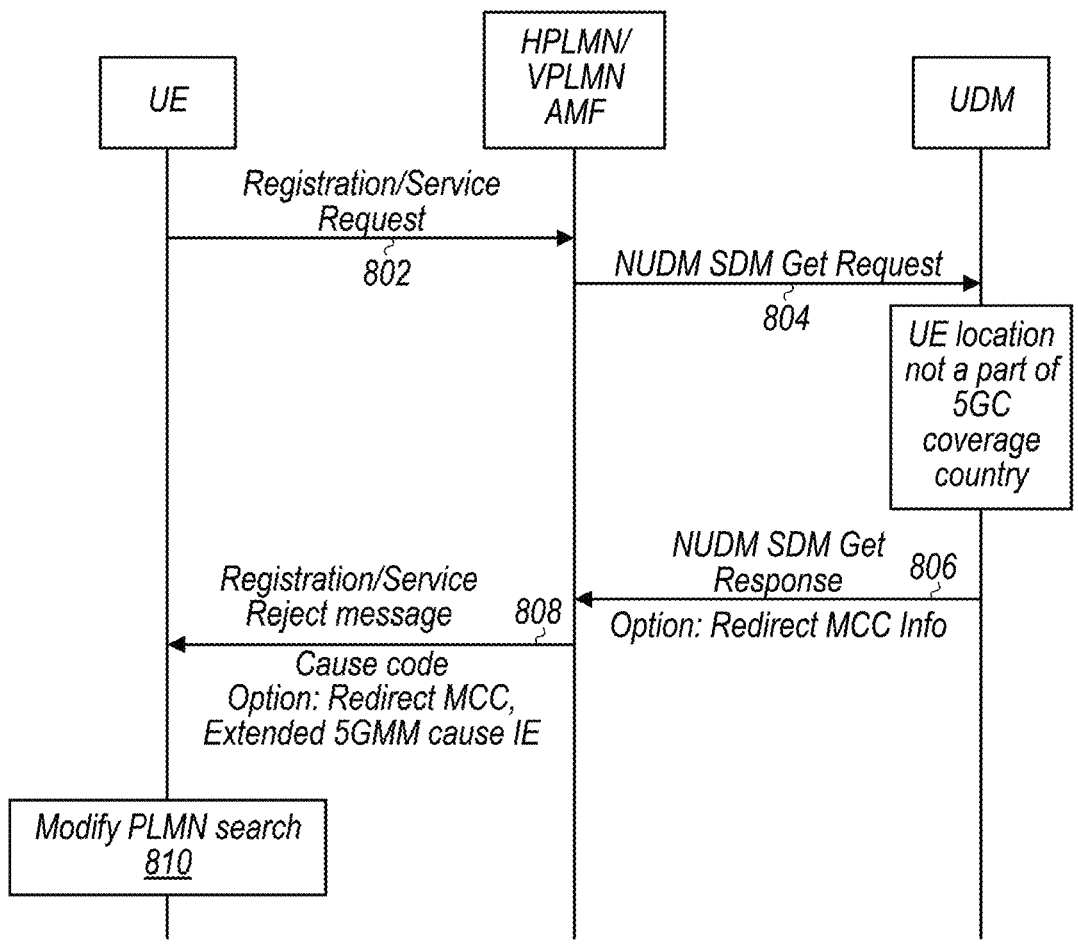
FIG. 8 is a communication flow diagram illustrating a method for a UE to attempt a registration procedure with a non-terrestrial network (NTN)

FIGS. 6A-B and schematic diagrams illustrating interworking between 3GPP terrestrial and satellite radio access networks (RANs), according to some embodiments. As illustrated, in FIG. 6A, a UE 106 communicates with a 3GPP terrestrial RAN, e.g., through a gNB as shown in FIGS. 1-2.

The 3GPP terrestrial RAN is coupled via an N2 interface with a core network, and a 3GPP satellite RAN is also coupled to the core network via the N2 interface. FIG. 6B illustrates a UE 106 operating with a cell to obtain 3GPP terrestrial access. The UE 106 also operates within a broader geographic range that provides 3GPP satellite access.

Public Land Mobile Networks

In cellular communications, cellular service providers or carriers may provide cellular service through public land mobile networks (PLMNs). While PLMNs are typically associated with cellular communications, it is anticipated that 5G NR may utilize PLMNs for servicing satellite networks, also known as non-terrestrial networks (NTNs). Embodiments herein describe methods and devices for improving communications and preserving regulatory compliance in association with PLMN selection for NTNs. As used herein, NTNs are contrasted with "terrestrial networks", which include both cellular and non-3GPP (e.g., wireless local area network (WLAN)) networks.

Cellular service providers typically control their subscribers' wireless devices' roaming behavior by providing a user-preferred public land mobile network (UPLMN) list and an operator-defined public land mobile network (OPLMN) list. The UPLMN and/or OPLMN list may be stored in elementary files in the SIM card, and may specify PLMN-radio access technology (RAT) relative priorities, which may be influenced or defined by roaming agreements between the operator providing the UPLMN/OPLMN list and operators of other PLMNs. PLMNs included in the UPLMN/OPLMN list may also be referred to as preferred PLMNs (PPLMNs). A UE may select and register on a PLMN and RAT from the PPLMN list when roaming e.g., in order to quickly acquire service from a suitable service provider.

It is possible that a UPLMN/OPLMN may not be available in a roaming scenario, and a possible fallback option may be for the UE to randomly select an available PLMN or select the PLMN with the strongest signal strength and try to register. However, with such a random selection, there may be a significant likelihood that the visited PLMN (VPLMN) may reject the registration request, or try to push the UE away with steering, which may cause a significant delay for the UE to acquire service.

Some legacy implementations for ranking PLMN selection employ a plurality of tiers of PLMN lists, which a UE may utilize to determine an order of PLMNs upon which to attempt to camp (for example, when a UE moves to a new region and attempts to reestablish cellular service). In some legacy implementations, when a UE is switched on at a new location (e.g., within a new circle), an initial search is performed based on a registered PLMN (RPLMN), with valid location information of the RPLMN contained in a subscriber identity module (SIM) card of the UE. For example, the initial UE search may include a short list search (SLS) and a derived band search (DBS) on all supported technologies.

Wireless communication deployments that contain both cellular and NTN PLMNs introduce additional complications for PLMN selection. Embodiments herein present systems and methods to address these and other challenges.

PLMN Selection for NTN Access

FIGS. 6A-D illustrate four different satellite deployment scenarios, according to some embodiments. In FIGS. 6A-D, the shaded ovals indicate satellite coverage areas, whereas the unshaded circles represent country and other area boundaries.

FIG. 6A illustrates deployment scenario A. As illustrated, a satellite provides a cell that broadcasts signals to country A, but the coverage area unintentionally leaks across the border of country A to cover a portion of adjacent countries B and C. The PLMN identifier (ID) broadcast in the cell of FIG. 6A has a mobile country code (MCC) corresponding to Country A.

FIG. 6B illustrates deployment scenario B, where a satellite intentionally services countries A, B and C but the coverage area unintentionally leaks into country D. Scenario B may be deployed in several different ways, according to various embodiments. As a first possibility (scenario B1), the satellite may broadcast three PLMN IDs with three different MCCs corresponding to countries A, B and C. In this scenario, the PLMN operator may be registered and obtain a mobile network code (MNC) in each country. In this scenario, it may be desirable for a UE to intelligently choose the MCC corresponding to the country of either its HPLMN or the physical location of the UE, to avoid accessing a neighboring country's MCC. For example, the UE may be close to a border between two countries (e.g., the Germany-Austria border), and it may be desirable for the UE to avoid accessing satellites of the neighboring country near border locations. To address these and other concerns, during a PLMN selection procedure for NTN access, if a UE discovers two or more MCCs during the PLMN scan and one of the MCCs belongs to the HPLMN of the UE, the UE may generally prioritize selection of the MCC that belongs to the HPLMN. In other embodiments, when the UE is able to detect the country where it is currently located, e.g. via GPS techniques, the UE may select the PLMN belonging to the MCC where the UE is physically located. However, the UE may implement exceptions to this general prioritization under certain conditions. For example, the UE may only prioritize the HPLMN MCC as long as it is within a predetermined distance from the border of the country of the MCC and/or if the UE is below a predetermined mobility threshold. Alternatively, the UE may prioritize the HPLMN MCC as long as the RSRP of the HPLMN MCC is above a predetermined threshold, such as −115 dBm or another threshold. Alternatively, the UE may always attempt registration on the HPLMN MCC for a predetermined number of attempts (e.g., 5 attempts), and may attempt registration on other available MCCs if the registration attempt fails the predetermined number of times. In some embodiments, if registration on the HPLMN MCC is unsuccessful the predetermined number of times, the UE may receive prioritized list(s) of PLMNs from a system information block (SIB) broadcast message received from the network, and may perform a PLMN search based on the priority list. In some embodiments, the broadcast message may contain a polygon geofence or coordinates describing a geographical area within which each of one or more priority rankings are to take effect.

As another possibility (scenario B2), a single PLMN ID corresponding to one country (e.g., country A) may be broadcast, and extra-territorial use of the PLMN ID, along with the conditions for such use, may be defined by communications standards. In this scenario, during a PLMN selection procedure, if a UE is unable to determine the exact country where the UE is located (e.g., when the UE is close to a border and doesn't have sufficiently accurate location information), the UE may request to register with an NTN PLMN by first providing its presumed location as country A (its home country).

As a third possibility (scenario B3), a global/shared PLMN ID (e.g., with a MCC 9xx) may be broadcast.

Mechanisms for servicing global/shared PLMN IDs, are described in greater detail below.

FIG. 6C illustrates another deployment scenario (scenario C), where a satellite access cell spans across a country (country A) and its contiguous area (e.g., water or airspace) and leaks into an adjacent international area. In this scenario, the PLMN ID broadcast in the cell may have an MCC of country A. In some embodiments, in this deployment scenario, a UE with a home PLMN (HPLMN) of country A may move into the international area. The UE may determine that it is in the international area through a network-provided database or an internal database maintained in UE memory or in the UE SIM card, among other possibilities. The UE may then calculate its distance from the boundary of country A's contiguous area. If the calculated distance is greater than a threshold distance and/or if the remaining battery life of the UE is above a threshold, the UE may utilize a shorter interval for performing higher priority PLMN searches. Alternatively, if the calculated distance is less than the threshold distance and/or the remaining battery life of the UE is below a threshold, the UE may utilize a longer interval for performing higher priority PLMN searches. Said another way, the UE may configure the interval for performing subsequent higher priority PLMN searches to be shorter or longer than a default interval depending on one or more of the above criteria.

FIG. 6D illustrates another deployment scenario (scenario D), where a satellite that is dedicated to an international area provides a cell that leaks into an adjacent country and/or its contiguous area. Scenario D may be deployed in several different ways, according to various embodiments. As a first possibility (scenario D1), the PLMN ID broadcast in the cell is a global/shared PLMN ID (with MCC 9xx). As a second possibility (scenario D2), the PLMN ID broadcast in the cell is the PLMN ID of the operator of the PLMN, and the MCC may be the MCC of the home country of the PLMN.

Lawful Interception Regulations

In some areas, lawful interception (LI) regulations have established the requirement to "enforce the use of a Core Network (CN) of a PLMN in the country where the UE is physically located". The requirement that the selected PLMN must have a core network in the same country may present challenges for the UE during the PLMN selection procedure. The core network location verification may take place during the registration procedure (by AS or NAS). However, from the protocol efficiency and resource utilization efficiency point of view, it may be advantageous for the UE to still select a PLMN in a way that reduces the possibility of registration rejection due to a registration attempt in the wrong country.

Embodiments herein present devices and methods for a UE to determine which PLMN(s) to select in the country of its physical location, to satisfy the LI requirements of that country. Alternatively, international areas (e.g., international waters) typically do not have LI requirements, and alternative mechanisms for PLMN selection for NTN access may be utilized when a UE is located in an international area. In various embodiments, the selection criteria may be preconfigured in the UE or provided by a PLMN.

NTN Registration Rejection

In some embodiments, it may be desirable to limit a UE's PLMN selection to consider only PLMN candidates belonging to one country. When a UE sends a Registration request to an AMF not serving the country where the UE is located, the AMF may send a DE-REGISTRATION REQUEST, a REGISTRATION REJECT message, or another NAS message. In some embodiments, the AMF may additionally indicate to the UE in the DE-REGISTRATION REQUEST, REGISTRATION REJECT, or other NAS message that the UE should select a PLMN in different country. The AMF may additionally indicate a target MCC List (e.g. based on UE location) in the DE-REGISTRATION REQUEST, REGISTRATION REJECT or other NAS message, to assist the UE in PLMN selection. In some embodiments, a UE which is already registered with the PLMN in country A has now moved to country B. In such cases, AMF, based on detection of UE's physical location may proactively send a DEREGISTRATION REQUEST message.

In some embodiments, a UE which is not provisioned for NTN access by the regulatory and/or network requirements of the country where it is located may have its registration request to a first PLMN for NTN access rejected by the network. In these embodiments, it may advantageous for the network to provide additional information to the UE along with its registration reject message. For example, the network may respond with a reject cause indication that specifies (at least in part) the reason for the rejection.

5G Mobility Management (5GMM)/Reject cause (a): As a first possibility, a first NTN may specify that NTN next generation radio access network (NG-RAN) access to the 5G core network (5GC) is not allowed. This may signify that the 5GC on the first NTN and/or on the first PLMN do not allow satellite NG-RAN access to the UE. In response, the UE may stop attempting search and registration/reselection for NTN access on the first PLMN and may reselect to NG-RAN on a different PLMN for NTN access and/or search for terrestrial 3GPP and/or non-3GPP access on the same PLMN.

In some embodiments, the UE may reset its behavior (i.e., if may resume a PLMN search for NTN access, including potentially attempting to register on the first PLMN) when a particular condition is met, e.g., when the UE powers off and on again, airplane mode toggles on and off, the user subscriber identity module (USIM) of the UE is removed, or the UE is registered to another PLMN, among other possibilities.

5GMM/Reject cause (b): As a second possibility, the first NTN may specify that satellite NG-RAN access to the 5GC is not allowed because the first NTN does not know the location at a country level of the UE that is requesting access. This reject cause may be provided when UE access and mobility context information (specifically location information) is not available in the UE context at the AMF. Responsive to receiving a 5GMM/Reject cause (b), the UE may disable attempts to acquire NTN NG-RAN access and may search for an available terrestrial 3GPP and/or non-3GPP access network (e.g., cellular or WiFi, among other possibilities). If the UE successfully registers and obtains access to a terrestrial network, and if the NTN PLMN access is of higher priority, the UE may then reattempt registration with the first NTN through the first PLMN, as the UE may provide location information via the RAN through the UE context based on its connection with the terrestrial network. The UE may resume attempts to obtain NTN access via a PLMN after the UE is successfully registered over terrestrial 3GPP and/or non-3GPP access, when it powers off and powers on again, when it toggles airplane mode on and off, or when the USIM is removed, among other possibilities.

5GMM/Reject cause (c): As a third possibility, the first NTN may specify that NTN NG-RAN access is not allowed in the country where the UE is located. For example, NTN NG-RAN access may be prohibited due to regulatory requirements of the country. This may signify that the UE should not search or attempt on any PLMN via NTN NG-RAN while it is in this country. As another example, the UE may be accessing the PLMN of a different MCC than the MCC where the UE is physically located. Responsive to receiving a reject cause (c), the UE may disable attempts to acquire NTN NG-RAN access for all PLMNs belonging to the same MCC where it received the rejection, and the UE may search for an available terrestrial 3GPP and/or non-3GPP access network (e.g., cellular or WiFi, among other possibilities). The UE may resume attempts to obtain NTN access via a PLMN after the UE powers off and powers on again, or when it physically moves to another country, among other possibilities. The UE may also attempt NTN NG-RAN access via a PLMN belonging to a different MCC in the same country.

5GMM/Reject cause (d): As a fourth possibility, the first NTN may specify that there is a mismatch between the location at a country level of the UE and the country associated with the first NTN. For example, the UE may have sent a request to a 5GC in a country that doesn't serve the current location of the UE, and the first NTN may redirect or provide information to the UE to attempt NTN access on a different country's NTN. The information may include list of MCCs where the UE may attempt re-registration while the UE continues to be in the same country. For example, the UE may be in a neighboring country that has overlapping coverage with the NTN cell of the country associated with the first NTN. Responsive to receiving a 5GMM/reject cause (d), the UE may mark NTN access to the NG-RAN as disabled for the MCC of the first NTN, and may initiate a PLMN search for one or more other NTNs. In some embodiments, the UE may perform registration for NTN access on a PLMN associated with an MCC indicated by the network in the registration rejection message.

In some embodiments, 5GMM/reject cause (a) may be set as a "default" 5GMM/reject cause, and 5GMM/reject causes (b), (c) and (d) may be indicated as extended 5GMM satellite cause code information elements (IEs), appended to the 5GMM/reject cause (a). Alternately, these 5GMM/reject causes may be used with available 5GMM causes.

FIG. 7—Call Flow Diagram for NTN Access Rejection

FIG. 7 is a call flow diagram illustrating a method wherein a UE requests registration to a first NTN through an AMF and receives a service rejection or registration rejection, according to some embodiments.

Aspects of the method of FIG. 7 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. In some embodiments, the UE may communicate directly with a base station, and the base station may in turn communicate with an access mobility function (AMF) of a 5GC that services the PLMN of the NTN. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

At 702, a UE initiates a non-access stratum (NAS) procedure with a first PLMN of a first NTN. The NAS procedure may be an initial registration procedure, a mobility registration update procedure or a service request procedure, among other possibilities. In initiating the NAS procedure, the UE sends NAS request message to the first PLMN of the first NTN. The NAS request message may be a mobility registration update procedure or a service request, among other possibilities. The first PLMN may be a home PLMN (HPLMN) or visited PLMN (VPLMN) of the UE. The first PLMN may be serviced by an AMF. The NAS request message may be sent as part of a first registration procedure with the first PLMN.

The AMF may determine location information of the UE from the request received from the UE, and at 704 the AMF sends a NUDM subscriber data management (SDM) Get Request message including the location information to the unified data management (UDM). The UDM may be part of a core network, such as a 5G Core Network (5GC). The UDM determines that the UE is not subscribed to 5GC NTN access in this location or that the UE location is not within the country or countries covered by the 5GC, and at 706 responds to the AMF with a NUDM SDM Get Response message with (optionally) redirect MCC information. The redirect MCC information may include information related to one or more MCCs associated with NTNs other than the first NTN for which the UE may be eligible to obtain network access.

At 708, the AMF sends a NAS response message to the UE with a reject cause indicator. The NAS response message may be a service rejection message, a registration rejection message, or a deregistration request message, among other possibilities. The NAS response message 708 may optionally contain the MCC redirection information and/or the extended 5GMM cause IE. For example, the message 708 may include any of the reject causes (a)-(d) described above. The NAS response message indicates that the UE is not allowed to access a core network of the first NTN. The NAS response message may further indicate that the UE is not allowed to access the core network of the first NTN because a location of the UE is unknown to the first NTN, that access to the first NTN is not allowed in a country in which the UE is located, or that a location of the UE is not within a country associated with the first NTN. The NAS response message may indicate a first MCC of a first country associated with the first NTN and may indicate that the UE is not located within the first country. The MCC redirection information may indicate a first MCC for which the UE is eligible to obtain NTN access.

At 710, the UE modifies its PLMN search and/or registration behavior responsive to receiving the NAS response message 708. In some embodiments, responsive to receiving the NAS response message, the UE may update its 5G status to a ROAMING NOT ALLOWED state for NTN access, wherein the UE refrains from performing PLMN search and registration procedures while in the ROAMING NOT ALLOWED state. In some embodiments, the UE may perform a search to access a terrestrial network responsive to receiving the NAS response message. In some embodiments, the UE may successfully establish a connection with a first terrestrial network, and perform a second NAS procedure (e.g., a registration or service request procedure) with the first PLMN, where the UE provides an identifier of the first terrestrial network to the first NTN during the second NAS procedure. The identifier of the first terrestrial network may be useable by the first NTN to determine a location of the UE. Alternatively or additionally, the UE may disable registration procedures for the first NTN for a predetermined period of time.

In some embodiments, when the NAS response message indicates the first MCC of the first country associated with the first NTN and indicates that the UE is not located within the first country, the UE may modify its behavior by disabling NTN access for the first MCC and initiating a PLMN search for NTN networks other than the first NTN belonging to a different MCC.

In some embodiments, when the NAS response message indicates an MCC for which the UE is eligible to obtain NTN access, the UE may modify its behavior by performing a second NAS procedure (e.g., a registration or service request procedure) with a second PLMN of a second NTN associated with the first MCC. Alternatively, the 5GMM/reject causes may be communicated to the UE using other NAS messages.

Figure 9:
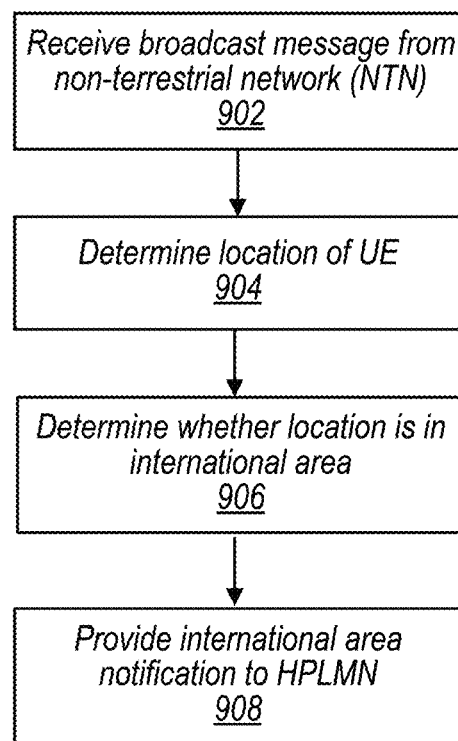
FIG. 9 is a flowchart diagram illustrating a method for a UE to communicate with a dedicated international area NTN.

FIG. 9—PLMN Selection in International Areas

Satellite access networks cover large portions of the globe, including international areas. In some deployments, specific legal requirements (e.g., SA3-LI) may be mandated in international areas, such as that any solution addressing extraterritorial (e.g., international maritime zone and aeronautical) use cases may be required to provide means for a travelling UE to notify its HPLMN on roaming in and out of those areas.

Embodiments herein present methods and devices to accommodate legal and regulatory requirements, while also improving connectivity and the user experience. For example, methods are described to facilitate PLMN selection when a UE determines that it is in an international area, and the UE may utilize information to aid in PLMN selection for NTN access. The information may be pre-configured in the UE or it may be provided by the PLMN, in various embodiments.

In some embodiments, a UE may be travelling through an international area, for example, a user may be traveling in a cruise from Australia to New Zealand. The international area may be serviced by a dedicated satellite D1. The traveling UE may have a home PLMN in country A, or the UE may be roaming on a PLMN in country A (e.g., country A may be Australia in this example, which may be either the home country or a roaming country of the UE).

FIG. 9 is a flow chart diagram illustrating a method for a UE to communicate with an NTN that is dedicated to servicing an international area, according to some embodiments. Aspects of the method of FIG. 9 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. In some embodiments, the UE may communicate directly with a base station, and the base station may in turn communicate with an access mobility function (AMF) of a 5GC that services the PLMN of the NTN. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

At 902, a satellite of an NTN transmits a downlink message including an IE which states whether it is a dedicated satellite for an international area. For example, the IE may be a one-bit true/false indicator that declares whether the satellite is dedicated to servicing an international area. The downlink message may be a broadcast message, a dedicated non-access stratum (NAS) message, or another type of downlink message, in various embodiments.

In some embodiments, the satellite transmits a downlink message that specifies one or more prioritized lists of PLMNs. The message may be the same message transmitted at step 902, or it may be a separate type of broadcast or other downlink message. The downlink message may additionally specify a polygon geofence or coordinates describing one or more geographical regions within which the UE is to utilize the one or more prioritized lists of PLMNs for performing PLMN selection.

In some embodiments, the satellite transmits a downlink message that specifies a first factor by which the UE modifies a search timer periodicity for the first PLMN, where the first factor is selected based at least in part on a satellite type servicing the NTN. The message may be the same message transmitted at step 902, or it may be a separate message. When the satellite type is geosynchronous equatorial orbit (GEO), the first factor may decrease the search timer periodicity, and when the satellite type is low earth orbit (LEO) or high-altitude pseudo-satellite (HAPS), the first factor may increase the search timer periodicity.

At 904, responsive to receiving the indication that the satellite is dedicated to servicing an international area, a UE may determine its physical location (e.g., using GPS, GNSS, context from a serving base station, or other methods).

At 906, the UE determines whether it is in an international area. For example, the UE may compare its location to a polygon geofence or another type of map provided by the network to determine whether it is in an international area. The polygon geofence may describe a geographical extent of the international area, and it may be received within a steering of roaming (SoR) container from the NTN that is provisioned by the HPLMN of the UE. Determining whether the current location is in the international area may include determining whether the current location is within the geographical extent of the polygon geofence.

At 908, the UE may indicate to a network during a registration procedure (e.g., either an initial registration or a mobility registration updating procedure) whether it is in the international area. For example, the UE may include an IE in a REGISTRATION REQUEST or MOBILITY REGISTRATION UPDATE message indicating whether it is in an international area. The indication of whether the UE is in the international area may be provided by the serving PLMN to the HPLMN of the UE. For example, the AMF servicing the UE may inform the HPLMN of the UE that the UE is in the international area, to comply with regulatory requirements.

In some embodiments, the UE may store a reference point, which is the geographical location or coordinates at which the UE enters an international area/waters from a contiguous area/waters. When the UE crosses the reference point, the UE may start tracking its distance from the reference point.

Figure 10A:
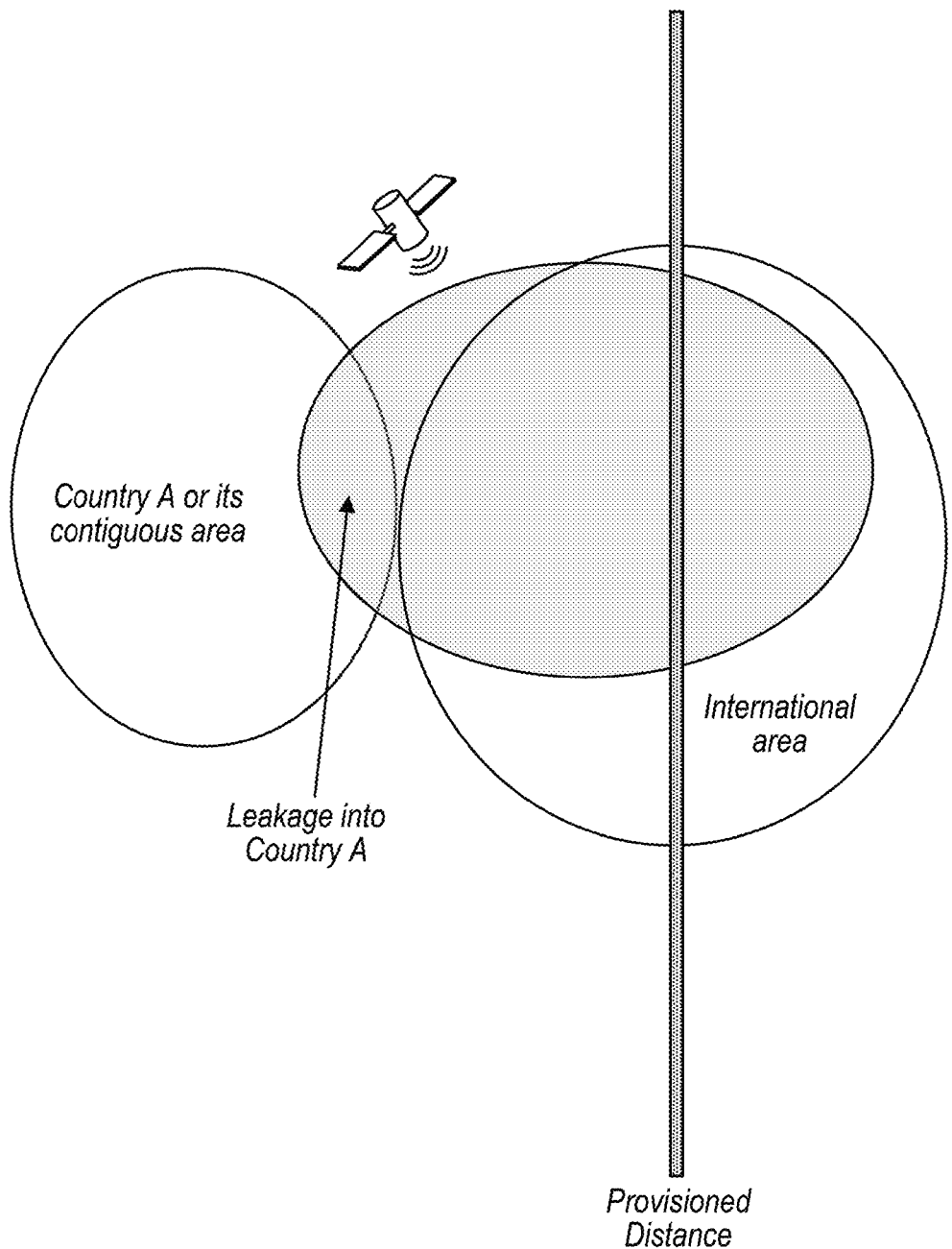
FIGS. 10A-B are satellite deployment scenarios illustrating a provisioned distance from a coverage area, according to various embodiments.
Figure 10B:
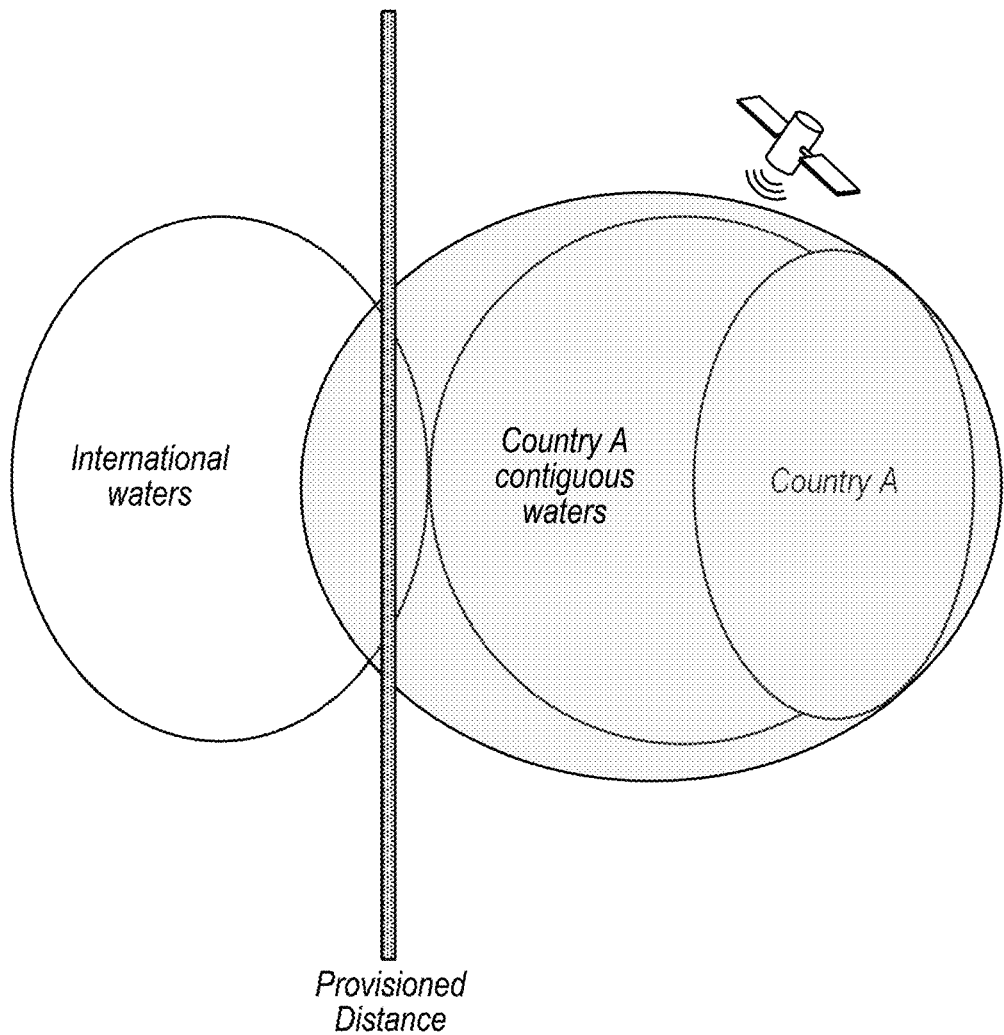

In some embodiments, the UE may retrieve information indicating a provisioned distance from the border of country A, or from the border of country A's contiguous waters, within which the UE may use country A's MCC while in the international area. For example, FIGS. 10A-B illustrate a provisioned distance away from country A or its contiguous area/waters, in various embodiments. The information indicating the provisioned distance may be received from its home PLMN, it may be received in a broadcast from the NTN servicing the international area, or it may be retrieved from a local database of the UE (e.g., from the USIM or other memory of the UE). While the UE is within the provisioned distance from the reference point, the UE may use country A's MCC. When the UE moves outside of the provisioned distance from the reference point, the UE may perform a prioritized PLMN search to select to a high priority PLMN in the international area. The prioritized PLMN search may prioritize the PLMN that is dedicated to servicing the international area, as one example.

In some embodiments, the UE may utilize a polygon geofence to direct PLMN selection. For example, the UE may compare the distance from the reference point with the geofence coordinates to determine whether it is within the geofence, and hence whether to stay with its current serving PLMN or to select another PLMN in the international area. In some embodiments, the geofence may define boundaries of multiple different geographical regions, and each region may be associated with a particular priority ranking for performing a PLMN search. The UE may then perform a PLMN search for NTN access according to the priority ranking of the region where it is currently located. The polygon geofence may be defined based on a distance in one or more directions from the reference point, based on latitude and longitude coordinates, based on a collection of latitudes and longitudes to provide a geographical map, or based on any another methodology, as desired.

In some embodiments, the UE may provide a capability indication to the network indicating whether the UE support 5G NR SAT access. The capability indication may be a one-bit IE indicating that the UE does or does not support 5G NR SAT access. In some embodiments, the network may transmit the polygon geofence information and/or the first factor that modifies the search periodicity for PLMNs to the UE in response to receiving an indication that the UE does support 5G NR SAT access. The network may refrain from transmitting this information if the UE does not support 5G NR SAT access.

TABLE 1

Geofence Region PLMN Validity List

| | Country A (serving PLMN) | Country B | Country C | Country D | Distance |
|---|---|---|---|---|---|
| Point A | Valid | X | X | X | 100 NM |
| Point B | X | Valid | X | X | 35 NM |
| Point C | X | X | X | Valid | 75 NM |

Table 1 illustrates a PLMN validity matrix for points at different distances from the reference point. In Table 1, "NM" stands for nautical miles. As illustrated, from point A up to a radius of 100 NM around point A, country A's PLMN(s) shall be considered valid, while the PLMNs of countries B, C and D are not considered valid. Conversely, from point B up to a radius of 35 NM around point B, the PLMNs of country B are considered valid, whereas from point C up to a radius of 75 NM around point C, the PLMNs of country D are valid. Reference points A, B and C may be identified based on latitude and longitude, for example.

Methods for Handling Shared and Global PLMN IDs

In some implementations, PLMN IDs with the format MCC=9xx are reserved for shared/global PLMNs. These PLMNs are not associated with any particular country and may be assigned by the International Telecommunication Union (ITU). Satellite access networks providing coverage globally typically use these PLMN IDs. Legacy PLMN selection procedures may not fully accommodate shared/global PLMN IDs. For example, a UE typically searches for higher priority PLMNs with the same MCC as their currently selected VPLMN. Accordingly, a UE served by a VPLMN may not typically re-select to a PLMN using a global/shared MCC, and vice-versa. To address these and other concerns, modifications are proposed to the PLMN selection procedure to handle shared/global PLMN IDs.

In some embodiments, when a native MCC for a UE is available in cellular coverage, the UE may prioritize the cellular MCC so the UE can move freely between terrestrial and NTN access with LEO coverage on a registered PLMN (RPLMN).

When cellular MCC coverage is not available, if the shared PLMN mapping to the PLMN list includes the HPLMN, the shared PLMN may have the same priority as the HPLMN. Otherwise, the shared PLMN may be assigned the priority of the lower VPLMN of all listed PLMNs in the PLMN list.

In some embodiments, a UE may prioritize an NTN PLMN when the UE has sufficient battery remaining, but may switch to prioritizing terrestrial PLMNs when the battery life drops below a threshold. The NTN PLMN and the terrestrial PLMNs may be equivalent home PLMNs (EHPLMNs), preferred PLMNs (PPLMNs) (i.e., user PLMNs (UPLMNs)), or operator PLMNs (OPLMNs), among other possibilities.

In various embodiments, information to aid in handling shared/global PLMN IDs (e.g., a mapping table) may be pre-configured in the UE or provided by a PLMN.

In some embodiments, a UE may be configurable with different settings to prioritize or deprioritize NTN NG-RAN communications. For example, a first configuration setting may prioritize NTN NG-RAN over cellular (terrestrial) NG-RAN (e.g., 5G NR), whereas a second configuration may prioritize cellular NG-RAN over NTN NG-RAN. A third configuration setting may disable NTN NG-RAN. The configuration setting may be stored in a USIM of the UE, and the configuration setting may specify, for each of one or more MCCs, whether the UE is allowed access NTN NG-RAN and/or whether NTN NG-RAN is preferred over cellular NG-RAN. The UE may then utilize the configuration setting as part of its internal RAT prioritization logic.

Alternatively, in some embodiments the NW may provide the configuration setting, e.g., within a registration accept message or a configuration update message. Alternatively, configuration setting information may be provided at the access stratum level via radio resource control (RRC) redirection signaling. In some embodiments, the application function (AF) may provide the configuration setting to a registered PLMN (RPLMN) AMF to be forwarded to the UE.

Search Timer Modification for PLMN Search

In some embodiments, a UE may modify its search timer behavior for different types of NTN access. For example, for the high priority PLMN (HPPLMN), the UE may maintain a normal (i.e., default) search timer periodicity. The UE may receive a scaling factor m(sat) that modifies the search timer periodicity for different types of NTNs. The scaling factor may be retrieved from the USIM of the UE or the UE's internal memory, or it may be received from a steering of roaming (SoR) container) provided by the HPLMN. In some embodiments, m(sat) is a 4-bit (or another number of bits) multiplier that specifies a factor from the set {1/16, 1/8, 1/4, 1/2, 0, 1, 2, 4, 8, 16} (or another set of values) with which to modify the PLMN search periodicity. The scaling factor may increase the search frequency for PLMNs corresponding to low earth orbit (LEO) satellites and high-altitude pseudo-satellites (HAPS), and may decrease the search frequency for PLMNs corresponding to geosynchronous equatorial orbit (GEO) satellites, relative to the search frequency for the HPPLMN. PLMNs for medium earth orbit (MEO) satellites may utilize an m(sat) value that is intermediate between those used for LEO and GEO satellites, in some embodiments. A value of m=0 may be used to cause a UE to refrain from performing any searches for NTN access for a particular type of NTN access, and this type of NTN access may be acquired exclusively through handover or reselection processes. The steering of roaming information may also provide the priority PLMN list for utilization in international areas.

Figure 11:
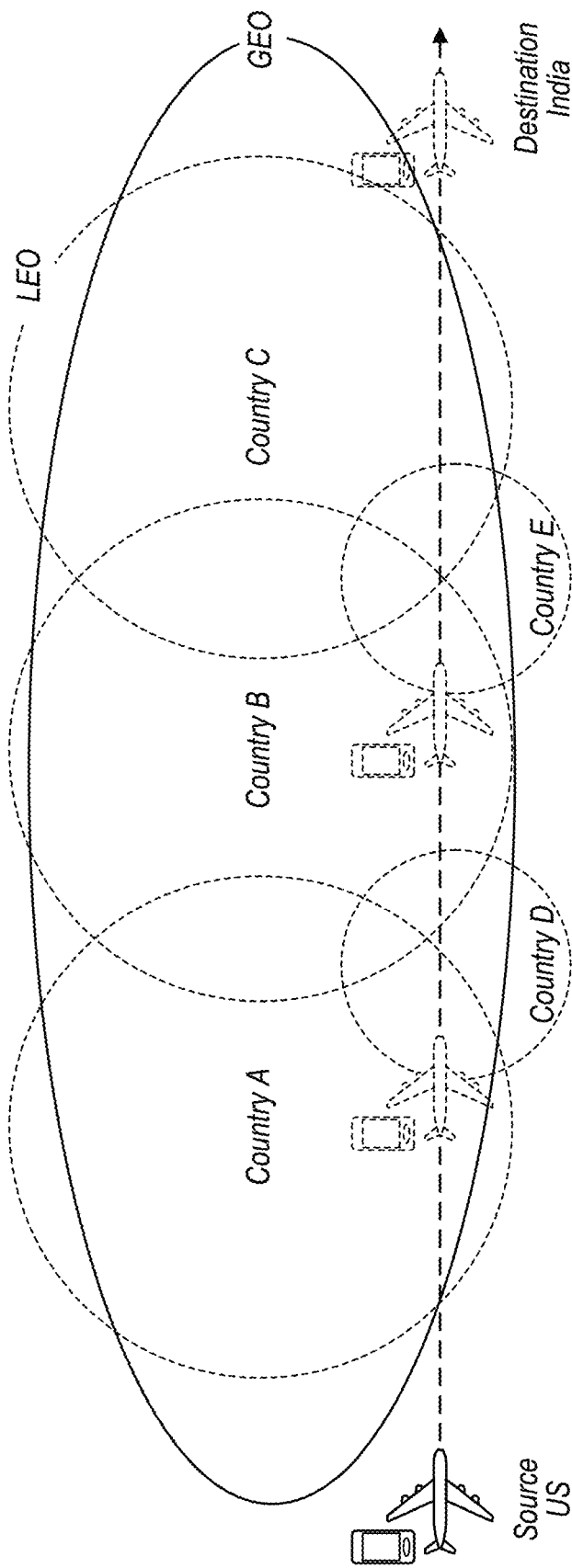
FIG. 11 is a schematic illustration of a UE on an airplane flight through a plurality of coverage areas, according to some embodiments.

FIG. 11 illustrates a scenario where a user in a plane travels from the U.S. to India, passing through LEO coverage areas of countries A, B, C, D and E during the flight. Additionally a GEO satellite provides broader coverage to the indicated region with a global/shared PLMN. In some embodiments, the UE may search for PLMNs of the LEO satellites with a lower frequency, since the UE will move into and out of these smaller coverage areas in a shorter amount of time, whereas the UE may perform searches with a higher frequency on the PLMN of the GEO satellite.

TABLE 2

OPLMN Priority Table - Example 1

| Priority | OPLMN RAT | Note |
|---|---|---|
| 1 | 910-410 NR SAT | NTN PLMN allowed in country 310 |
| 2 | 405-829 NR, LTE | Different country, no search needed |
| 3 | 310-210 NR | UE camped on this PLMN |
| 4 | 316-211 NR | Low priority PLMN of same country |

Table 2 illustrates an example priority table for OPLMN selection. As illustrated, a UE is currently camped on OPLMN 310-210 with a priority rank of 3. OPLMN 910-410 provides NTN access which is allowed in country A, and is given the highest priority ranking. OPLMN 405-829 corresponds to a different country, and is not searched by the UE. OPLMN 316-211 is a low priority PLMN of country A, and has a priority rank of 4. In some embodiments, the search timer for the 910-410 OPLMN may be increased from its default value (e.g., 6 minutes) by an m(sat) factor of 10 such that the OPLMN 910-410 is only searched every 60 minutes, as one example.

TABLE 3

OPLMN Priority Table - Example 2

| Priority | OPLMN RAT | Note |
|---|---|---|
| 1 | 310-410 NR SAT | NTN PLMN allowed in country 310 |
| 2 | 310-266 NR, LTE | Terrestrial network in the same country |
| 3 | 310-210 NR | UE camped on this PLMN |
| 4 | 316-211 NR | Low priority PLMN of same country |

Table 3 illustrates another example priority table for OPLMN selection. As shown, a UE is currently camped on OPLMN 310-210 with a priority rank of 3. OPLMN 310-410 provides NTN access which is allowed in country A, and is given the highest priority ranking. OPLMN 310-266 corresponds to a terrestrial network in the same country where the UE is currently camped. OPLMN 316-211 is a low priority PLMN of country A, and has a priority rank of 4. In some embodiments, the search timer may continue to be the same existing HPPLMN search timer as the UE performs searches for terrestrial networks.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, a device includes: an antenna; a radio coupled to the antenna; and a processing element coupled to the radio. The device may be configured to implement any of the method embodiments described above.

In some embodiments, a memory medium may store program instructions that, when executed, cause a device to implement any of the method embodiments described above.

In some embodiments, an apparatus includes: at least one processor (e.g., in communication with a memory), that is configured to implement any of the method embodiments described above.

In some embodiments, a method includes any action or combination of actions as substantially described herein in the Detailed Description and claims.

In some embodiments, a method is performed as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some embodiments, a wireless device is configured to perform any action or combination of actions as substantially described herein in the Detailed Description, Figures, and/or claims.

In some embodiments, a wireless device includes any component or combination of components as described herein in the Detailed Description and/or Figures as included in a wireless device.

In some embodiments, a non-volatile computer-readable medium may store instructions that, when executed, cause the performance of any action or combination of actions as substantially described herein in the Detailed Description and/or Figures.

In some embodiments, an integrated circuit is configured to perform any action or combination of actions as substantially described herein in the Detailed Description and/or Figures.

In some embodiments, a mobile station is configured to perform any action or combination of actions as substantially described herein in the Detailed Description and/or Figures.

In some embodiments, a mobile station includes any component or combination of components as described herein in the Detailed Description and/or Figures as included in a mobile station.

In some embodiments, a mobile device is configured to perform any action or combination of actions as substantially described herein in the Detailed Description and/or Figures.

In some embodiments, a mobile device includes any component or combination of components as described herein in the Detailed Description and/or Figures as included in a mobile device.

In some embodiments, a network node is configured to perform any action or combination of actions as substantially described herein in the Detailed Description and/or Figures.

In some embodiments, a network node includes any component or combination of components as described herein in the Detailed Description and/or Figures as included in a mobile device.

In some embodiments, a base station is configured to perform any action or combination of actions as substantially described herein in the Detailed Description and/or Figures.

In some embodiments, a base station includes any component or combination of components as described herein in the Detailed Description and/or Figures as included in a mobile device.

In some embodiments, a 5G NR network node or base station is configured to perform any action or combination of actions as substantially described herein in the Detailed Description and/or Figures.

In some embodiments, a 5G NR network node or base station includes any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE), comprising:
a radio; and
a processor coupled to the radio, wherein the UE is configured to:
receive a downlink message from a non-terrestrial network (NTN), wherein the downlink message comprises a public land mobile network (PLMN) identifier of a first PLMN of the NTN including an information element (IE), wherein the IE indicates that the NTN is dedicated to an international area;
responsive to receiving the downlink message, determine a current location of the UE;
determine whether the current location is in the international area;
provide an international area notification to an access and mobility management function (AMF) servicing the UE to forward to a home PLMN (HPLMN) of the UE, wherein the international area notification indicates whether the current location is in the international area;
based on a determination that the current location is in the international area:
determine a distance of the UE from a border of a first country within which the UE has most recently established a network connection;
based on a determination that the distance is less than a predetermined threshold distance, register with a home PLMN with a mobile country code (MCC) of the first country; and
based on a determination that the distance is greater than the predetermined threshold distance, perform a PLMN search procedure based on a priority ranking indicated by a network of the first country.

2. The UE of claim 1,
wherein the predetermined distance is half of an estimated beam size of the downlink message.

3. The UE of claim 1, wherein the UE is further configured to:
based on a determination that the current location is not in the international area:

determine whether a most recently registered mobile country code (MCC) of the UE belongs to a shared PLMN; and based on a determination that the most recently registered MCC of the UE belongs to the shared PLMN, perform PLMN selection based on a shared PLMN database.

4. The UE of claim 1,
wherein the downlink message specifies one or more prioritized lists of PLMNs, and
wherein the downlink message specifies a polygon geofence or coordinates describing one or more geographical regions within which the UE is to utilize the one or more prioritized lists of PLMNs for performing PLMN selection.

5. The UE of claim 1,
wherein the downlink message specifies a first factor by which the UE modifies a search timer periodicity for the first PLMN, wherein the first factor is selected based at least in part on a satellite type servicing the NTN.

6. The UE of claim 5,
wherein when the satellite type is geosynchronous equatorial orbit (GEO), the first factor decreases the search timer periodicity, and
wherein when the satellite type is low earth orbit (LEO) or high-altitude pseudo-satellite (HAPS), the first factor increases the search timer periodicity.

7. The UE of claim 1,
wherein the indication whether the current location is in the international area is provided in an information element (IE) of a registration request message or service request message.

8. The UE of claim 1, wherein the UE is further configured to:
receiving a polygon geofence from the NTN within a steering of roaming (SoR) container provisioned by the HPLMN, wherein the polygon geofence describes a geographical extent of the international area,
wherein determining whether the current location is in the international area comprises determining whether the current location is within the geographical extent of the polygon geofence.

9. The UE of claim 1,
wherein the downlink message comprises:
a broadcast message, or
a dedicated non-access stratum (NAS) message.

10. The UE of claim 1, wherein the UE is further configured to:
transmit a capability indication to the network indicating whether the UE supports 5th generation New Radio (5G NR) satellite access.

11. A method for communicating with a non-terrestrial network (NTN), the method comprising:
by a user equipment (UE):
receiving a downlink message from the NTN, wherein the downlink message comprises a public land mobile network (PLMN) identifier of a first PLMN of the NTN including an information element (IE), wherein the IE indicates that the NTN is dedicated to an international area;
responsive to receiving the downlink message, determining a current location of the UE;
determining whether the current location is in the international area;
providing an international area notification to an access and mobility management function (AMF) servicing the UE to forward to a home PLMN (HPLMN) of the UE indicating whether the current location is in the international area; and
receiving a polygon geofence from the NTN within a steering of roaming (SoR) container, wherein the polygon geofence describes a geographical extent of the international area, and
wherein determining whether the current location is in the international area comprises determining whether the current location is within the geographical extent of the polygon geofence.

12. The method of claim 11, the method further comprising:
based on a determination that the current location is in the international area:
determining a distance of the UE from a border of a first country within which the UE has most recently established a network connection;
based on a determination that the distance is less than a predetermined threshold distance, registering with a home PLMN with a mobile country code (MCC) of the first country; and
based on a determination that the distance is greater than the predetermined threshold distance, performing a PLMN search procedure based on a priority ranking indicated by a network of the first country.

13. The method of claim 11,
wherein the downlink message specifies one or more prioritized lists of PLMNs, and
wherein the downlink message specifies a polygon geofence or coordinates describing one or more geographical regions within which the UE is to utilize the one or more prioritized lists of PLMNs for performing PLMN selection.

14. The method of claim 11,
wherein the downlink message specifies a first factor by which the UE modifies a search timer periodicity for the first PLMN, wherein the first factor is selected based at least in part on a satellite type servicing the NTN,
wherein when the satellite type is geosynchronous equatorial orbit (GEO), the first factor decreases the search timer periodicity, and
wherein when the satellite type is low earth orbit (LEO) or high-altitude pseudo-satellite (HAPS), the first factor increases the search timer periodicity.

15. An apparatus, comprising:
a processor configured to cause a user equipment (UE) to:
receive a downlink message from a non-terrestrial network (NTN), wherein the downlink message comprises a public land mobile network (PLMN) identifier of a first PLMN of the NTN including an information element (IE), wherein the IE indicates that the NTN is dedicated to an international area, wherein the downlink message specifies a first factor by which the UE modifies a search timer periodicity for the first PLMN, and wherein the first factor is selected based at least in part on a satellite type servicing the NTN;
responsive to receiving the downlink message, determine a current location of the UE;
determine whether the current location is in the international area; and
provide an international area notification to an access and mobility management function (AMF) servicing the UE to forward to a home PLMN (HPLMN) of the UE indicating whether the current location is in the international area.

16. The apparatus of claim 15, wherein the processor is further configured to cause the UE to:
based on a determination that the current location is in the international area:
determine a distance of the UE from a border of a first country within which the UE has most recently established a network connection;
based on a determination that the distance is less than a predetermined threshold distance, register with a home PLMN with a mobile country code (MCC) of the first country; and
based on a determination that the distance is greater than the predetermined threshold distance, perform a PLMN search procedure based on a priority ranking indicated by a network of the first country.

17. The apparatus of claim 15,
wherein the downlink message specifies one or more prioritized lists of PLMNs, and
wherein the downlink message specifies a polygon geofence or coordinates describing one or more geographical regions within which the UE is to utilize the one or more prioritized lists of PLMNs for performing PLMN selection.

18. The apparatus of claim 15,
wherein the downlink message specifies a first factor by which the UE modifies a search timer periodicity for the first PLMN, wherein the first factor is selected based at least in part on a satellite type servicing the NTN,
wherein when the satellite type is geosynchronous equatorial orbit (GEO), the first factor decreases the search timer periodicity, and
wherein when the satellite type is low earth orbit (LEO) or high-altitude pseudo-satellite (HAPS), the first factor increases the search timer periodicity.

19. The apparatus of claim 15, wherein the processor is further configured to cause the UE to:
based on a determination that the current location is not in the international area:
determine whether a most recently registered mobile country code (MCC) of the UE belongs to a shared PLMN; and
based on a determination that the most recently registered MCC of the UE belongs to the shared PLMN, perform PLMN selection based on a shared PLMN database.

20. The apparatus of claim 15,
wherein the indication whether the current location is in the international area is provided in an information element (IE) of a registration request message or service request message.

* * * * *